US012704593B2

(12) United States Patent
Guarín Aristizabal et al.

(10) Patent No.: US 12,704,593 B2
(45) Date of Patent: Aug. 11, 2026

(54) MULTI CHIP RADAR SYNCHRONIZATION

(71) Applicant: GM Cruise Holdings LLC, San Francisco, CA (US)

(72) Inventors: Gustavo Adolfo Guarín Aristizabal, Munich (DE); Benedikt Sanftl, Riedering (DE); Felix Hoehne, Aschheim (DE); Richard Johann Körber, Hallerndorf (DE); Bernhart Pelger-Alzner, Ottobrunn (DE); Markus Klose, Ottobrunn (DE); Johannes Grüner, Holzkirchen (DE)

(73) Assignee: GM Cruise Holdings LLC, San Francisco, CA (US)

( * ) Notice: Subject to any disclaimer, the term of this patent is extended or adjusted under 35 U.S.C. 154(b) by 561 days.

(21) Appl. No.: 17/899,713

(22) Filed: Aug. 31, 2022

(65) Prior Publication Data

US 2024/0069158 A1 Feb. 29, 2024

(30) Foreign Application Priority Data

Aug. 24, 2022 (EP) .................................... 22192013

(51) Int. Cl.
*G01S 7/40* (2006.01)
*G01S 7/35* (2006.01)
*G01S 13/931* (2020.01)

(52) U.S. Cl.
CPC ................ *G01S 7/40* (2013.01); *G01S 7/352* (2013.01); *G01S 13/931* (2013.01)

(58) Field of Classification Search
CPC ........... G01S 7/40; G01S 7/352; G01S 13/931
See application file for complete search history.

(56) References Cited

U.S. PATENT DOCUMENTS

| | | | | |
|---|---|---|---|---|
| 7,876,261 | B1 * | 1/2011 | Adams | G01S 7/282 342/174 |
| 10,911,094 | B1 * | 2/2021 | Heller | H04B 1/69 |
| 2015/0153445 | A1 * | 6/2015 | Jansen | G01S 7/032 342/195 |
| 2018/0115409 | A1 * | 4/2018 | Nayyar | G01S 13/343 |

(Continued)

OTHER PUBLICATIONS

"Extended European Search Report for European Patent Application No. 22192013.5", Mailed Date: Feb. 14, 2023, 9 pages.

*Primary Examiner* — Marcus E Windrich
(74) *Attorney, Agent, or Firm* — Honigman LLP; Matthew H. Szalach

(57) ABSTRACT

Various technologies described herein pertain to a radar sensor system including a signal generator that generates a clock signal, start of modulation signal, and local oscillator signal. The radar sensor system includes first and second radar chips. The first radar chip synchronizes a first clock engine in frequency based on the clock signal and the first clock engine in time based on the start of the modulation signal. The first radar chip provides a first radar signal based on the local oscillator signal; the first radar signal is synchronized with the first clock engine. The second radar chip synchronizes the second clock engine in frequency based on the clock signal and the second clock engine in time based on the start of modulation signal. The second radar chip provides a second radar signal based on the local oscillator signal; the second radar signal is synchronized with the second clock engine.

20 Claims, 9 Drawing Sheets

(56) References Cited

U.S. PATENT DOCUMENTS

| | | | | |
|---|---|---|---|---|
| 2019/0386665 | A1* | 12/2019 | Shalita | H03L 7/081 |
| 2020/0025870 | A1* | 1/2020 | Melzer | G01S 7/032 |
| 2020/0300965 | A1* | 9/2020 | Wu | G01S 7/42 |
| 2021/0223361 | A1* | 7/2021 | Guarin Aristizabal | G01S 13/931 |
| 2022/0365173 | A1* | 11/2022 | Moehlmann | G01S 7/4017 |
| 2023/0129011 | A1* | 4/2023 | Lulu | H04B 1/403<br>455/552.1 |
| 2025/0216508 | A1* | 7/2025 | Fliess | G01S 7/4008 |

* cited by examiner

MULTI CHIP RADAR SYNCHRONIZATION

RELATED APPLICATION

This application claims priority to European Patent Application No. 22192013.5, filed on Aug. 24, 2022, and entitled "MULTI CHIP RADAR SYNCHRONIZATION". The entirety of this application is incorporated herein by reference.

BACKGROUND

In connection with navigating an environment, an autonomous vehicle perceives objects surrounding the autonomous vehicle based upon sensor signals generated by sensor systems of the autonomous vehicle. For example, the autonomous vehicle may include a sensor system, such as a radar sensor system, for generating sensor signals. The autonomous vehicle also includes a centralized processing device that receives data based upon sensor signals generated by the sensor system and performs a variety of different tasks, such as detection of vehicles, pedestrians, and other objects. Based on an output of the processing device, the autonomous vehicle may perform a driving maneuver.

Radar sensor systems exhibit some advantages over other sensor systems such as lidar sensor systems and cameras with respect to their usage in autonomous vehicles. For instance, compared to cameras and lidar sensor systems, performance of radar sensor systems is more invariant to weather changes, such that data generated by a radar sensor system can be used to enable autonomous driving under certain weather conditions (such as heavy rain or snow). In addition, radar sensor systems are able to capture velocity information nearly instantaneously. Further, radar sensor systems have a greater range than cameras and lidar sensor systems.

A radar sensor system can emit radar signals into a surrounding environment. The radar sensor signals reflect off objects in the environment and the radar sensor system can detect the reflected radar signals. The radar sensor system commonly is configured to generate point clouds based on data obtained from the reflected radar signals. The point clouds generated by the radar sensor system can be transmitted to a centralized processing device, where the centralized processing device can identify objects in the environment based on the point clouds.

In various applications, such as radar sensor systems of vehicles (e.g., autonomous vehicles), it is desired to have relatively high resolution radar with relatively high angular resolution. The relatively high angular resolution can be achieved by increasing the number of channels in a radar sensor system. The number of transmitters and receivers can be increased to provide the increased number of channels. However, conventional radar sensor systems often include integrated circuits that support a limited number of transmitters and receivers; accordingly, such conventional radar sensor systems oftentimes have limited angular resolution.

For instance, a conventional radar sensor system can include a relatively small number of transceiver chips. According to an example, a conventional radar sensor system can include a lead transceiver and a follower transceiver (or a small number of follower transceivers). In such an architecture, the lead transceiver can generate a radar signal, which can be distributed to the follower transceiver(s). Thus, the lead transceiver and the follower transceiver(s) can utilize the radar signal generated by the lead transceiver (e.g., the lead transceiver and the follower transceiver(s) can emit the radar signal generated by the lead transceiver into the environment, the radar signal can be mixed with reflected radar signals detected by the lead transceiver and the follower transceiver(s), etc.).

However, in such conventional approaches, synchronization between the lead transceiver and the follower transceiver(s) can be difficult to implement. Conventional approaches can rely upon complex mechanisms to synchronize the lead transceiver and the follower transceiver(s). Moreover, as the number of channels increases to provide increased angular resolution, it can be increasingly difficult, if not impossible, to synchronize the lead transceiver and the follower transceiver(s) with such traditional systems. Further, in conventional approaches that employ the lead transceiver to generate a high frequency radar signal, such radar signal is often a low quality radar signal.

SUMMARY

The following is a brief summary of subject matter that is described in greater detail herein. This summary is not intended to be limiting as to the scope of the claims.

Described herein is a radar sensor system configured to synchronize multiple radar chips; the radar chips include transmitters and receivers of the radar sensor system. The radar sensor system includes a signal generator configured to generate a clock signal, a start of modulation signal, and a local oscillator signal. The radar sensor system further includes a first radar chip and a second radar chip. In various embodiments, it is contemplated that the radar sensor system can include more than two radar chips. The first radar chip includes a first clock engine and at least one of the first transmitter or a first receiver. The first radar chip is configured to receive the clock signal, the start of modulation signal, and the local oscillator signal from the signal generator. The first radar chip is configured to synchronize the first clock engine in frequency based on the clock signal. Moreover, the first radar chip is configured to synchronize the first clock engine in time based on the start of the modulation signal. Moreover, the first radar chip is configured to provide a first radar signal based on the local oscillator signal, where the first radar signal is synchronized with the first clock engine. The second radar chip includes a second clock engine and at least one of a second transmitter or a second receiver. The second radar chip is configured to receive the clock signal, the start of modulation signal, and the local oscillator signal from the signal generator. The second radar chip is further configured to synchronize the second clock engine in frequency based on the clock signal. Moreover, the second radar chip is configured to synchronize the second clock engine in time based on the start of modulation signal. The second radar chip is further configured to provide a second radar signal based on the local oscillator signal, where the second radar signal is synchronized with the second clock engine.

According to various embodiments, the radar sensor system can further include a radar processor. The radar processor can be in communication with the signal generator, the first radar chip, and the second radar chip (as well as other radar chip(s) of the radar sensor system, if any). The radar processor can be configured to control the signal generator such that the radar processor sets a modulation scheme and triggers a start of measurement performed by the radar sensor system. Moreover, the radar processor can be configured to receive radar data from the first radar chip and/or the second radar chip (and/or other radar chip(s) of the radar sensor system, if any); the radar processor can process such radar data to generate output data.

The clock signal generated by the signal generator (e.g., generated at a centralized point in the radar sensor system) can be utilized for synchronization between the radar chips in frequency. Moreover, the start of modulation signal generated by the signal generator (e.g., generated at the centralized point in the radar sensor system) can be utilized for synchronization between the radar chips in time. The start of modulation signal is a trigger signal that synchronizes the radar chips in time. Further, the local oscillator signal generated by the signal generator (e.g., generated at the centralized point in the radar sensor system) can be distributed to the radar chips (e.g., distributed to the transmitters and receivers of the radar chips) and can provide phase and phase noise coherence.

The approaches set forth herein provide a radar sensor system in which multiple radar chips of the radar sensor system can be synchronized. Performance of the radar sensor system can be enhanced relative to many conventional approaches by synchronizing the different radar chips of the radar sensor system in time and frequency. Moreover, phase and phase noise coherence can be provided utilizing the approaches set forth herein.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
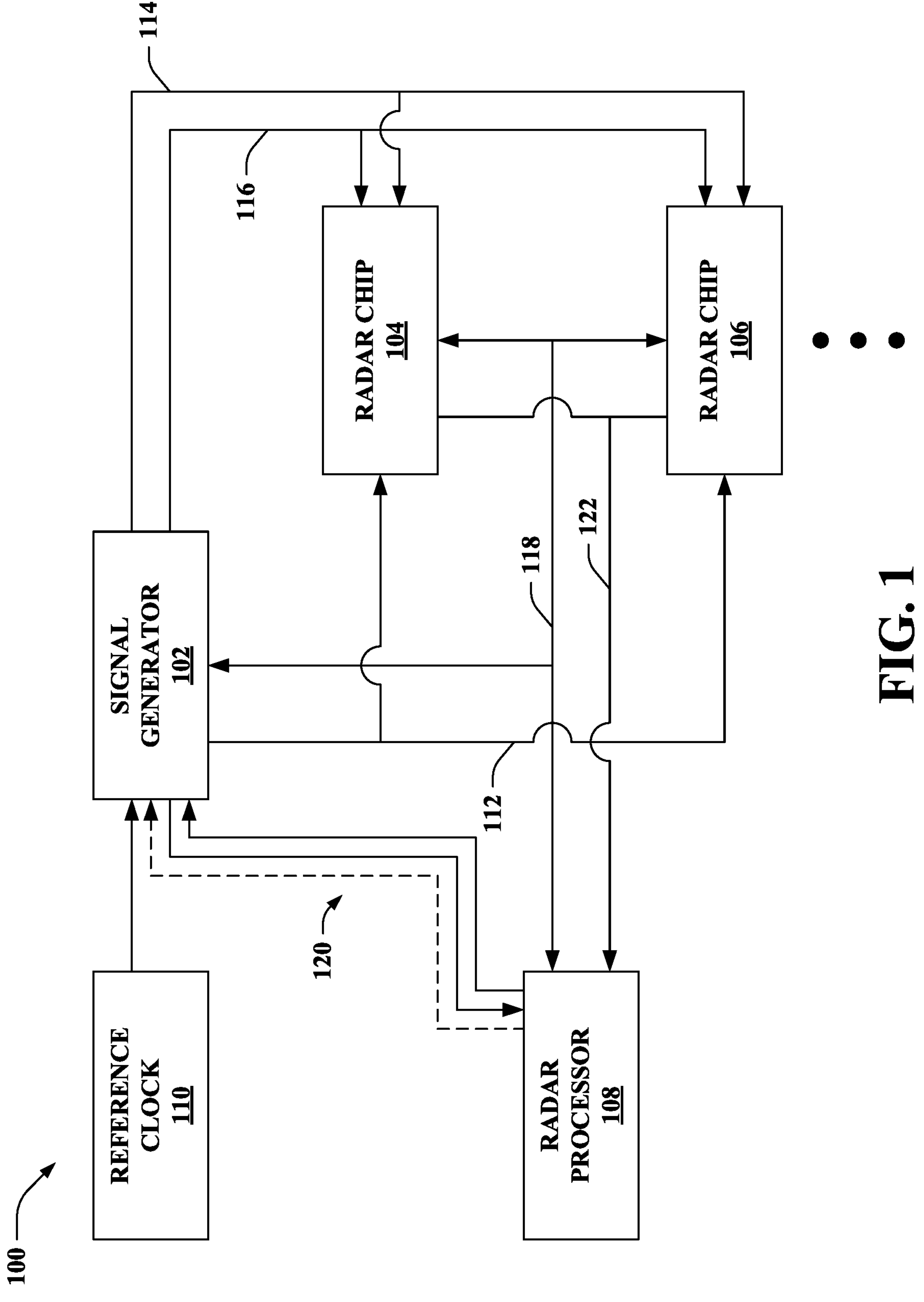
FIG. 1 illustrates a functional block diagram of an exemplary radar sensor system in which multiple radar chips are synchronized.

Various technologies pertaining to synchronizing multiple radar chips in a radar sensor system are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component", "module", and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean "serving as an illustration or example of something."

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Examples set forth herein pertain to an autonomous vehicle including a radar sensor system that synchronizes radar chips utilizing the techniques set forth herein. It is to be understood, however, that the radar sensor system described herein can be employed in a variety of different scenarios, such as flight, in drone technologies, in monitoring technologies (e.g., security technologies), and so forth. Autonomous vehicles are set forth herein as one possible use case, and features of the claims are not to be limited to autonomous vehicles unless such claims explicitly recite an autonomous vehicle.

Referring now to the drawings, FIG. 1 illustrates an exemplary radar sensor system 100 in which multiple radar chips are synchronized. The radar sensor system 100 includes a signal generator 102 and a plurality of radar chips. FIG. 1 shows the radar sensor system 100 including a first radar chip 104 and a second radar chip 106; yet, it is contemplated that the radar sensor system 100 can include substantially any number of radar chips in addition to the first radar chip 104 and the second radar chip 106. The first radar chip 104, the second radar chip 106, and any additional radar chip(s) included in the radar sensor system 100 (if any) are collectively referred to herein as radar chips 104-106. The radar chips 104-106 are separate from each other. For instance, each of the radar chips 104-106 can be separate integrated circuits. The radar sensor system 100 employs the signal generator 102 to synchronize operation of the radar chips 104-106. According to an example, an application specific integrated circuit can include the signal generator 104 (or the signal generator 104 can be an application specific integrated circuit). Following this example, the signal generator 104 can be part of a chip that is separate from the radar chips 104-106.

In various embodiments, the radar sensor system 100 can be employed on a vehicle, such as a land vehicle (e.g., an autonomous vehicle) or an aircraft, to identify positions and velocities of objects in an environment of the vehicle. However, the radar sensor system 100 can alternatively be employed in other sorts of systems and scenarios other than vehicles or aircrafts.

The radar chips 104-106 include transmitters and receivers. According to an example, each of the radar chips 104-106 can include both a transmitter and a receiver (e.g., each of the radar chips 104-106 can include a transceiver). Pursuant to another example, at least one of the radar chips 104-106 (e.g., the radar chip 104) can include one or more transmitters while lacking a receiver, and at least a differing one of the radar chips 104-106 (e.g., the radar chip 106) can include one or more receivers while lacking a transmitter. Following this example, at least one of the radar chips 104-106 can include an array of transmitters and at least another one of the radar chips 104-106 can include an array of receivers. Moreover, pursuant to yet a further example, it is contemplated that at least one of the radar chips 104-106 (e.g., the radar chip 104) can include a plurality of transmitters and at least one receiver. Additionally or alternatively, at least one of the radar chips 104-106 (e.g., the radar chip 106) can include a plurality of receivers and at least one transmitter. It is to be appreciated that a combination of the foregoing examples of the radar chips 104-106 can be included in the radar sensor system 100. Moreover, as discussed in greater detail below, each of the radar chips 104-106 includes a corresponding clock engine.

The radar sensor system 100 can further include a radar processor 108. The radar processor 108 can be in communication with the signal generator 102, the first radar chip 104, and the second radar chip 106 (as well as other radar chip(s) of the radar sensor system 100, if any). The radar processor 108 can be configured to control the signal generator 102 such that the radar processor 108 sets a modulation scheme and triggers a start of measurement performed by the radar sensor system 100. The radar processor 108 can also be configured to receive radar data from the first radar chip 104 and/or the second radar chip 106 (and/or other radar chip(s) of the radar sensor system 100, if any); the radar processor 108 can process such radar data to generate output data Moreover, the radar sensor system 100 can include a reference clock 110 that can provide a clock signal to the signal generator 102. Although being separate from the signal generator 102 in the example of FIG. 1, it is contemplated that the signal generator 102 can include the reference clock 110.

The signal generator 102 can be configured to generate a clock signal, a start of modulation signal, and a local oscillator signal. The clock signal can be a lower frequency signal (as compared to the local oscillator signal). Moreover, the clock signal can be used as a reference signal for transmitters and receivers of the radar chips 104-106. The clock signal allows for frequency synchronization with clock engines of the radar chips 104-106 (and thus, frequency synchronization with the transmitters and receivers of the radar chips 104-106). For instance, the clock signal generated by the signal generator 102 can be provided by the reference clock 110.

The local oscillator signal can be an analog signal having various desired signal characteristics (which may be controlled by the radar processor 108). For example, the local oscillator signal can be a frequency modulated continuous wave (FMCW) signal. Following this example, the characteristics of the local oscillator signal that can be controlled include pulse shape, bandwidth of a pulse, pulse repetition interval (PM), period of a pulse (e.g., period of a ramp), slope of a pulse, start frequency of a pulse, and the like. In other examples, the local oscillator signal can be a phase modulated continuous wave (PMCW) signal, an orthogonal frequency division multiplexing (OFDM) signal, or the like.

The local oscillator signal can have a higher frequency as compared to the clock signal. The local oscillator signal can be used by the radar chips 104-106 to provide radar signals to drive the transmitters and receivers of the radar chips 104-106. According to an example, the local oscillator signal can have a lower frequency than the radar signals provided by the radar chips 104-106 in order to reduce losses due to distribution from the signal generator 102 to the radar chips 104-106. Following such example, the local oscillator signal can be multiplied in frequency and amplified by the radar chips 104-106. Further, use of the local oscillator signal can provide coherency in phase and phase noise.

The signal generator 102 can transmit the clock signal 112 to the radar chips 104-106. Moreover, the signal generator 102 can transmit the start of modulation signal 114 to the radar chips 104-106. Further, the signal generator 102 can transmit the local oscillator signal 116 to the radar chips 104-106.

The radar chip 104 can receive the clock signal 112, the start of modulation signal 114, and the local oscillator signal 116 from the signal generator 102. The radar chip 104 can synchronize a first clock engine of the radar chip 104 in frequency based on the clock signal 112. Moreover, the radar chip 104 can synchronize the first clock engine in time based on the start of modulation signal 114. Further, the radar chip 104 can provide a first radar signal based on the local oscillator signal 116, where the first radar signal is synchronized with the first clock engine. The first radar signal can be transmitted into an environment of the radar sensor system 100 by transmitter(s) of the radar chip 104 (if any). Additionally or alternatively, the first radar signal can be mixed with reflected radar signal(s) detected by receiver(s) of the radar chip 104 (if any).

The radar chip 106 can similarly be synchronized based on the clock signal 112, the start of modulation signal 114, and the local oscillator signal 116 from the signal generator 102. For instance, the radar chip 106 can receive the clock signal 112, the start of modulation signal 114, and the local oscillator signal 116. Further, the radar chip 106 can synchronize a second clock engine of the radar chip 106 in frequency based on the clock signal 112. The radar chip 106 can further synchronize the second clock engine in time based on the start of modulation signal 114. Moreover, the radar chip 106 can provide a second radar signal based on the local oscillator signal 116, where the second radar signal is synchronized with the second clock engine. The second radar signal can be transmitted into an environment of the radar sensor system 100 by transmitter(s) of the radar chip 106 (if any). Additionally or alternatively, the second radar signal can be mixed with reflected radar signal(s) detected by receiver(s) of the radar chip 106 (if any).

Other radar chip(s) of the radar sensor system 100, if any, can similarly be synchronized based on the clock signal 112, the start of modulation signal 114, and the local oscillator signal 116 from the signal generator 102. According to an example, a third radar chip (not shown) can include a third clock engine. The third radar chip can receive the clock signal 112, the start of modulation signal 114, and the local oscillator signal 116 from the signal generator 102. The third radar chip can synchronize the third clock engine in frequency based on the clock signal 112, and can synchronize the third clock engine in time based on the start of modulation signal 114. Moreover, the third radar chip can provide a third radar signal based on the local oscillator signal 116, where the third radar signal is synchronized with the third clock engine. Similar to above, the third radar signal can be transmitted into an environment of the radar sensor system 100 by transmitter(s) of the third radar chip (if any). Additionally or alternatively, the third radar signal can be mixed with reflected radar signal(s) detected by receiver(s) of the third radar chip (if any). Accordingly, synchronization between the radar chips 104-106 can be supported utilizing the signals 112-116 provided by the signal generator 102.

As noted above, the radar processor 108 is in communication with the signal generator 102 and the radar chips 104-106. The radar sensor system 100 can include a communication bus 118 between the radar processor 108, the signal generator 102, and the radar chips 104-106. The radar processor 108 can be configured to control the signal generator 102 such that the radar processor 108 sets a modulation scheme and triggers a start of measurement performed by the radar sensor system 100. Information specifying the modulation scheme can be sent from the radar processor 108 to the signal generator 102 via the communication bus 118; thus, the signal generator 102 can implement such modulation scheme based on the information received from the radar processor 108. Moreover, the radar processor 108 can communicate with the radar chips 104-106 via the communication bus 118 to configure the radar chips 104-106 for a desired radar sequence. As such, the radar processor 108 can control sampling of received radar signals (e.g., a reflected radar signal received by a receiver and mixed with the radar signal provided by a particular radar chip) performed by the radar chips 104-106, powering up of transmit circuitry of the radar chips 104-106, and so forth via communications sent via the communication bus 118.

Moreover, the radar processor 108 can send a start of measurement signal to the signal generator 102 to trigger the start of measurement performed by the radar sensor system 100. According to an example, the start of measurement signal can be sent via the communication bus 118. Pursuant to another example, the start of measurement signal can be sent from the radar processor 108 to the signal generator 102 via input/output (I/O) signaling 120. The I/O signaling 120 enables the radar processor 108 to communicate with the signal generator 102 through a two-way communication port. As part of the I/O signaling 120, the start of measurement signal can be sent from the radar processor 108 to the signal generator 102 (e.g., the start of measurement signal can either be sent via the I/O signaling 120 or the communication bus 118). Moreover, data can be sent from the signal generator 102 to the radar processor 108 via the I/O signaling 120. Further, a reset signal can be sent from the radar processor 108 to the signal generator 102 via the I/O signaling 120 or through the communication bus 118.

The radar processor 108 can start measurement performed by the radar sensor system 100 by sending the start of measurement signal to the signal generator 102 via the data bus 118 or via I/O signaling 120. The start of modulation signal generated by the signal generator 102 can be aligned with the start of measurement signal received from the radar processor 108. For instance, a programmable delay can set a period of time between the start of measurement signal and initiation of modulation of the local oscillator signal (e.g., start of ramp generation performed by the signal generator 102). The programmable delay can be programmed to compensate for routing and delay on the clock engines of the radar chips 104-106. Accordingly, the start of modulation signal 114 can be aligned based on the start of measurement signal and the programmable delay. The start of modulation signal 114 can be a trigger signal used to align the clock engines of the radar chips 104-106 in time.

Further, the radar processor 108 can receive radar data 122 from the radar chips 104-106. Radar chip(s) that include receiver(s) (e.g., a subset or all of the radar chips 104-106) can send the radar data 122 to the radar processor 108. For instance, a signal output by a receiver of a radar chip can be digitally sampled by an analog to digital converter (ADC) to output digital values over time. The digital values outputted by the ADC can be referred to as the radar data outputted by the radar chip. The radar data can be indicative of a reflected radar signal (e.g., a return signal received responsive to a radar signal) received by the receiver. Thus, according to an example where the radar chip 104 and the radar chip 106 each include a receiver, the radar processor 108 can receive first radar data from the radar chip 104 and second radar data from the radar chip 106 (as well as radar data from other radar chip(s) of the radar chip 104-106, if any). Following this example, the radar processor 108 can process the first radar data and the second radar data (as well as the radar data from any other radar chip, if any) to generate output data. The output data, for instance, can include data pertaining to distance to an object detected nearby the radar sensor system 100, velocity of the object detected nearby the radar sensor system 100, and so forth.

The radar sensor system 100 allows for increasing a number of channels as compared to conventional radar sensor systems. Accordingly, by increasing the number of channels, angular resolution of the radar sensor system 100 can be enhanced relative to conventional radar sensor systems that include fewer channels. Moreover, the radar sensor system 100 enables the radar chips 104-106 (which include the transmitters and receivers providing such channels) to be synchronized; the synchronization of the radar chips 104-106 is scalable such that a greater number of radar chips 104-106 can be synchronized as compared to conventional approaches.

Figure 2:
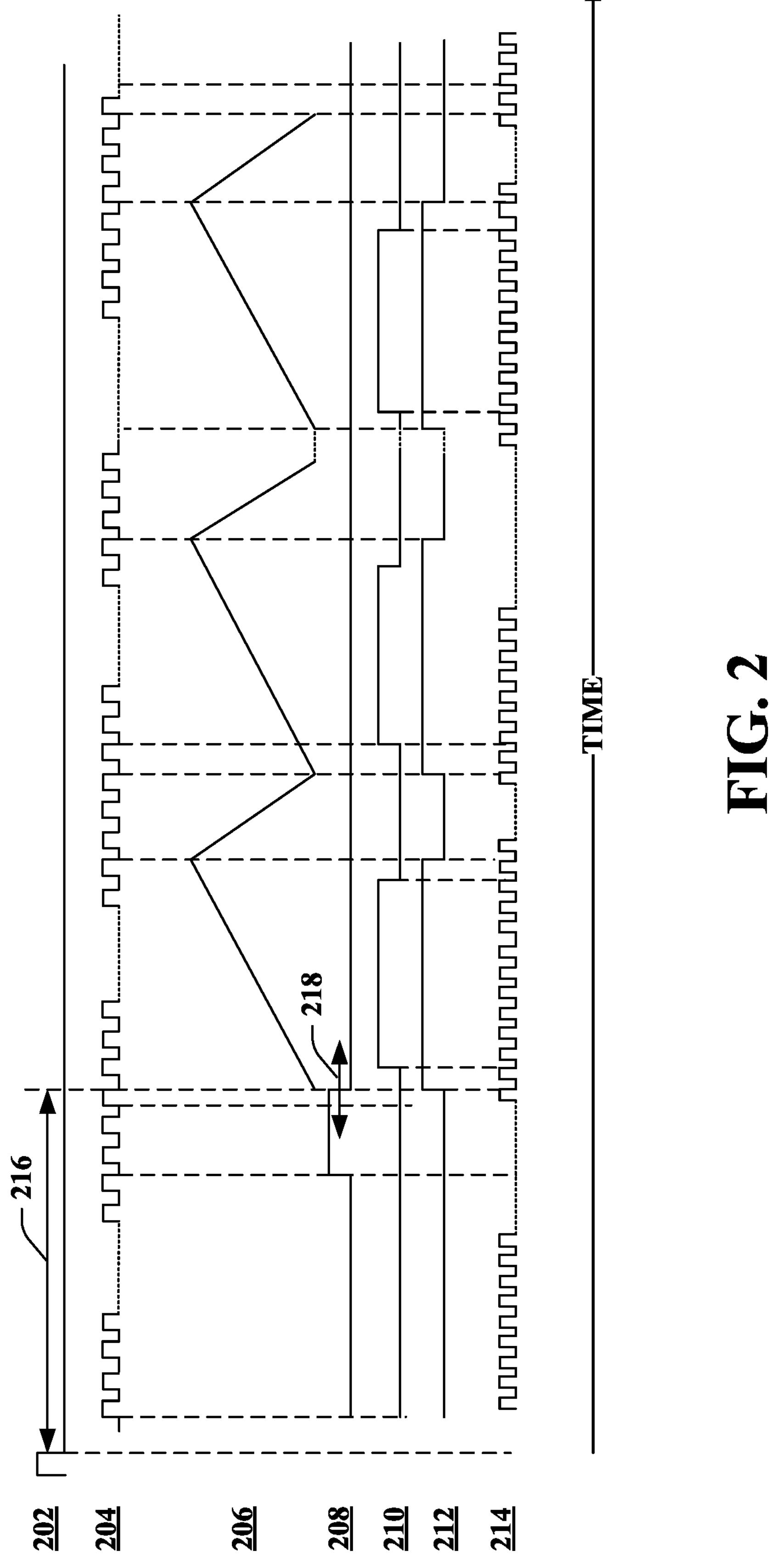
FIG. 2 illustrates an exemplary signal diagram of the radar sensor system of FIG. 1.

Now referring to FIG. 2, illustrated is an exemplary signal diagram 200 of the radar sensor system 100 of FIG. 1. The diagram 200 includes a start of measurement signal 202, which can be a pulse that is used to trigger the signal generator 102 to start modulation. As noted above, the start of measurement signal 202 can be sent over the communication bus 118 or via I/O signaling 120 from the radar processor 108 to the signal generator 102. The start of measurement signal can be a square signal; however, the claimed subject matter is not so limited. The diagram 200 also includes a clock signal 204 at the signal generator 102 (e.g., the clock signal 112). The clock signal 204 can have a frequency in a range from 20 MHz to 100 MHz; however, the claimed subject matter is not so limited. Moreover, the diagram 200 includes a local oscillator signal 206 at the signal generator 102 (e.g., a ramp generated at the signal generator 102, the local oscillator signal 116). According to an example, the local oscillator signal 206 can be a 20 GHz signal, a 40 GHz signal, or the like; following this example, the radar chips can multiply the local oscillator signal 206 in frequency (e.g., to provide an 80 GHz radar signal). Pursuant to another example, the local oscillator signal 206 can have a frequency in a range from 2 GHz to 80 GHz. However, the claimed subject matter is not limited to the foregoing examples. Further, the diagram 200 also includes a start of modulation signal 208 (e.g., the start of modulation signal 114). The start of modulation signal 208 is a trigger signal that indicates to the radar chips 104-106 when to start to power on and activate internal circuits (e.g., when to power an amplifier of a receiver, etc.). A programmable delay 216 can be set from a falling edge of the start of measurement signal 202 to a beginning of ramp generation of the local oscillator signal 206. Moreover, a programmable shift 218 can be employed to align a falling edge of the start of modulation signal 208 and the beginning of ramp generation of the local oscillator signal 206. According to an example, different programmable shifts can be employed for different radar chips 104-106 of the radar sensor system 100 (e.g., depending on electrical distance from the signal generator 102 to the respective radar chips 104-106).

The diagram 200 further includes an activation of a receiver 210 of a radar chip, an activation of a receiver 212 of the radar chip, and a clock time 214 of a clock engine of the radar chip. The clock time 214 of the clock engine of the radar chip is aligned based on the clock signal 204 and the start of modulation signal 208. The start of modulation signal 208 aligns in phase with a start point of modulation; thus, the start point of the radar signal at the radar chip is aligned based on the start of modulation signal 208. Moreover, the clock signal 204 causes the radar chips 104-106 to run at the same internal frequency.

Figure 3:
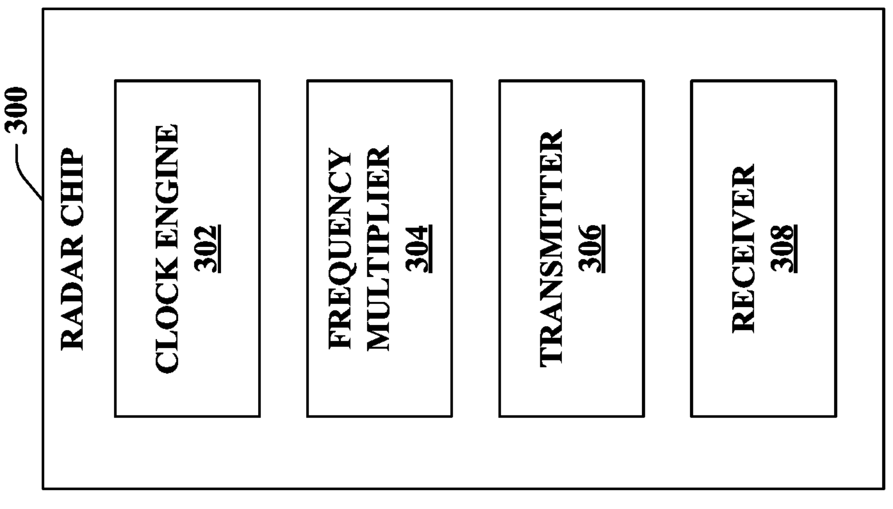
FIG. 3 illustrates a functional block diagram of an exemplary radar chip.

With reference to FIG. 3, illustrated is an exemplary radar chip 300. For instance, the radar chip 300 can be one of the radar chips 104-106 included in the radar sensor system 100 of FIG. 1. Moreover, in various embodiments, it is contemplated that each of the radar chips 104-106 included in the radar sensor system 100 of FIG. 1 can be substantially similar to the radar chip 300.

The radar chip 300 includes a clock engine 302, a frequency multiplier 304, a transmitter 306, and a receiver 308. As described herein, the radar chip 300 can receive the clock signal 112, the start of modulation signal 114, and the local oscillator signal 116 from the signal generator 102. The clock engine 302 can be synchronized in frequency based on the clock signal 112 received from the signal generator 102. Moreover, the clock engine 302 can be synchronized in time based on the start of modulation signal 114 received from the signal generator 102. Further, the frequency multiplier 304 can multiply the local oscillator signal (e.g., in frequency) to provide a radar signal for the radar chip 300. Although not shown, it is contemplated that the radar chip 300 can also include an amplifier that amplifies the local oscillator signal.

The transmitter 306 can transmit the radar signal into an environment of the radar sensor system 100. Further, a reflected radar signal (e.g., a return signal) can be received by the receiver 308 from the environment of the radar sensor system 100 responsive to the radar signal. For instance, the radar signal transmitted into the environment can be at least partially reflected by an object in the environment; the radar signal reflected by the object that propagates back to the radar sensor system 100 can be received by the receiver 308. For example, the reflected radar signal can be mixed with the radar signal and digitally sampled. Accordingly, radar data can be generated; such radar data can be transmitted to the radar processor 108.

Pursuant to an illustration, the radar chip 104 and the radar chip 106 can each be substantially similar to the radar chip 300. Following this illustration, the radar chip 104 can include a first transmitter and a first receiver, and the radar chip 106 can include a second transmitter and a second receiver. Further, following this illustration, other radar chip(s) included in the radar chips 104-106 can also be substantially similar to the radar chip 300; yet, the claimed subject matter is not so limited.

Figure 4:
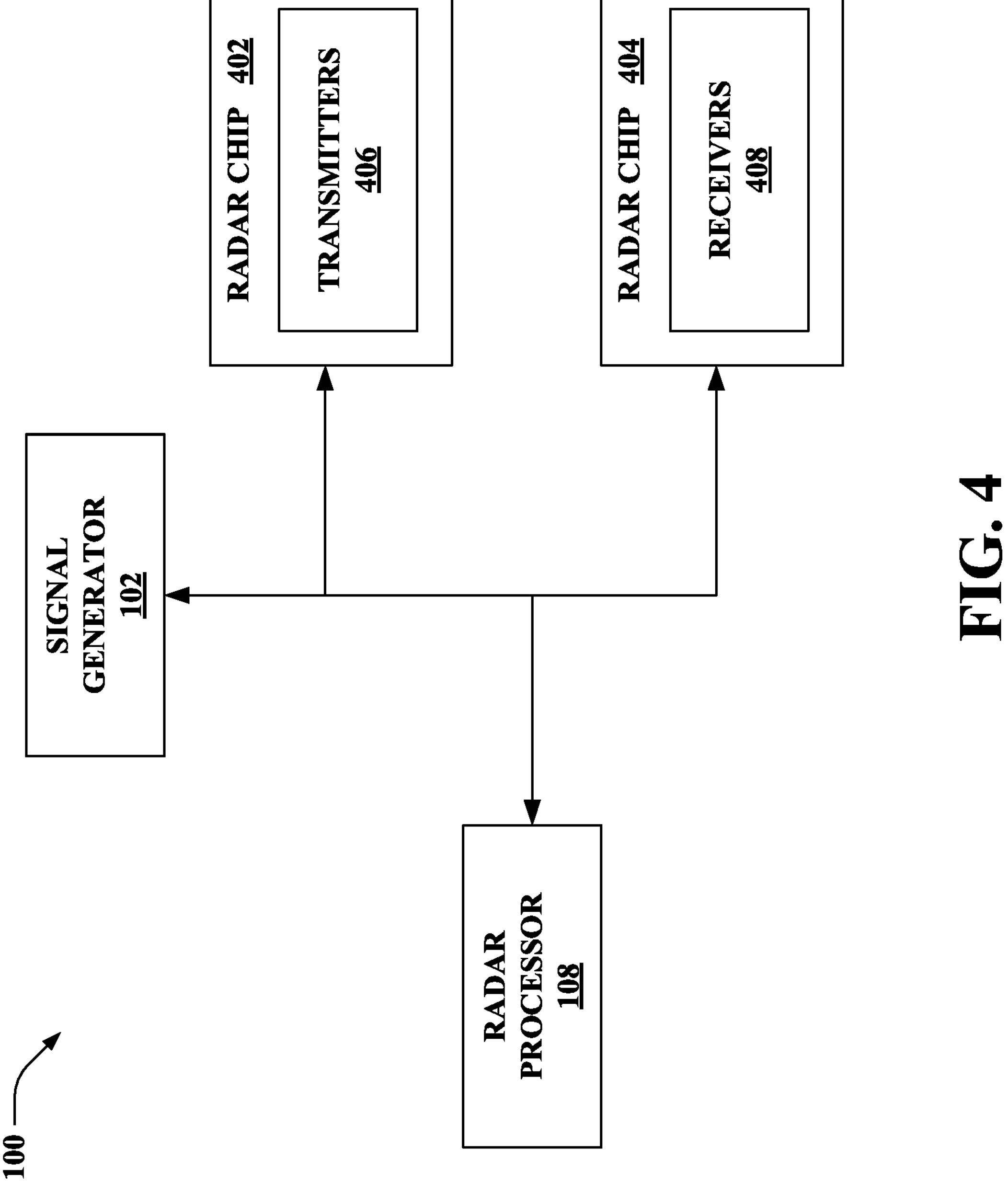
FIG. 4 illustrates a functional block diagram of an exemplary embodiment of the radar sensor system of FIG. 1.

With reference to FIG. 4, illustrated is an exemplary embodiment of the radar sensor system 100 of FIG. 1. The radar sensor system 100 of FIG. 4 includes the signal generator 102, the radar processor 108, and a plurality of radar chips (e.g., the radar chips 104-106). Although not shown, it is contemplated that the radar sensor system 100 can further include the reference clock 110. In the example of FIG. 4, the radar sensor system 100 includes two radar chips: a radar chip 402 and a radar chip 404. While the radar sensor system 100 is depicted in FIG. 4 as including two radar chips, it is contemplated that more than two radar chips can be included in the radar sensor system 100. In the example set forth in FIG. 4, the radar chip 402 includes a plurality of transmitters 406 and the radar chip 404 includes a plurality of receivers 408. For instance, the radar chip 402 can include an array of transmitters 406 and the radar chip 404 can include an array of receivers 408.

According to an example, the radar chip 402 including the transmitters 406 can lack a receiver, and the radar chip 404 including the receivers 408 can lack a transmitter. However, in another example, the radar chip 402 including the transmitters 406 can further include a receiver (or more than one receiver) and/or the radar chip 404 including the receivers 408 can further include a transmitter (or more than one transmitter).

Figure 5:
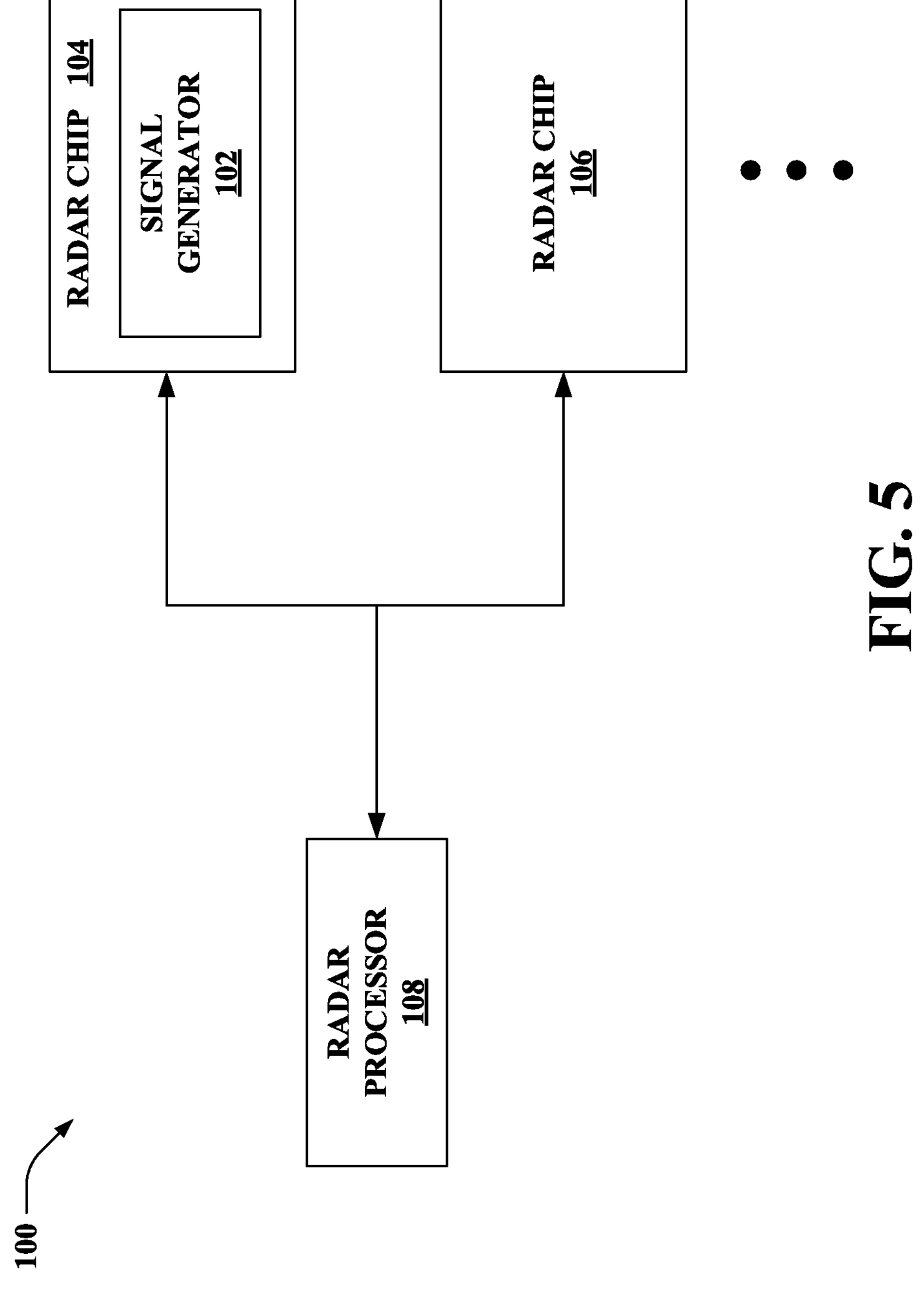
FIG. 5 illustrates a functional block diagram of another exemplary embodiment of the radar sensor system of FIG. 1.

Now turning to FIG. 5, illustrated is another exemplary embodiment of the radar sensor system 100 of FIG. 1. Again, the radar sensor system 100 includes the signal generator 102, the radar processor 108, and the radar chips 104-106. Also, although not shown, it is contemplated that the radar sensor system 100 of FIG. 5 can include the reference clock 110. In the example set forth in FIG. 5, the radar chip 104 includes the signal generator 102 (e.g., the signal generator 102 is integrated as part of the radar chip 104). Following this example and similar to above, the signal generator 102 included as part of the radar chip 104 can generate the clock signal, the start of modulation signal, and the local oscillator signal. The clock signal, the start of modulation signal, and the local oscillator signal can be utilized by the radar chip 104. Moreover, the clock signal, the start of modulation signal, and the local oscillator signal can be transmitted from the signal generator 102 included as part of the radar chip 104 to the other radar chip(s) 104-106.

Figure 6:
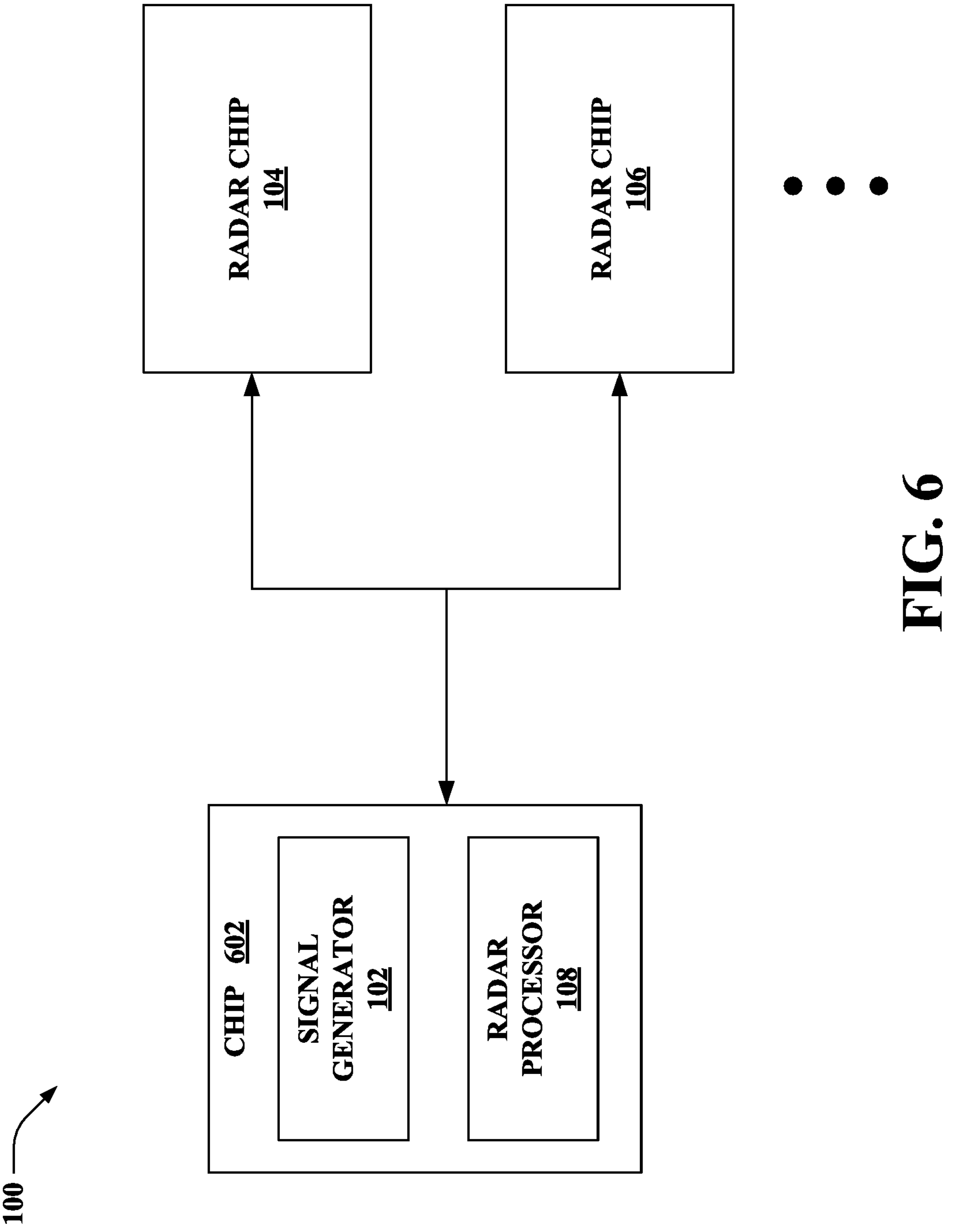
FIG. 6 illustrates a functional block diagram of yet another exemplary embodiment of the radar sensor system of FIG. 1.

Referring now to FIG. 6, illustrated is yet another exemplary embodiment of the radar sensor system 100 of FIG. 1. Similar to above, the radar sensor system 100 includes the signal generator 102, the radar processor 108, and the radar chips 104-106. Also, although not shown, it is contemplated that the radar sensor system 100 of FIG. 6 can include the reference clock 110. In the example of FIG. 6, the radar sensor system 100 includes a chip 602. The chip 602 is separate from the radar chips 104-106. Moreover, the chip 602 includes the signal generator 102 and the radar processor 108. Accordingly, the signal generator 102 and the radar processor 108 can be part of a common chip 602 in various embodiments.

Moreover, in various embodiments, it is contemplated that one or more of the examples set forth in FIGS. 3-6 can be combined as part of the radar sensor system 100 of FIG. 1.

Figure 7:
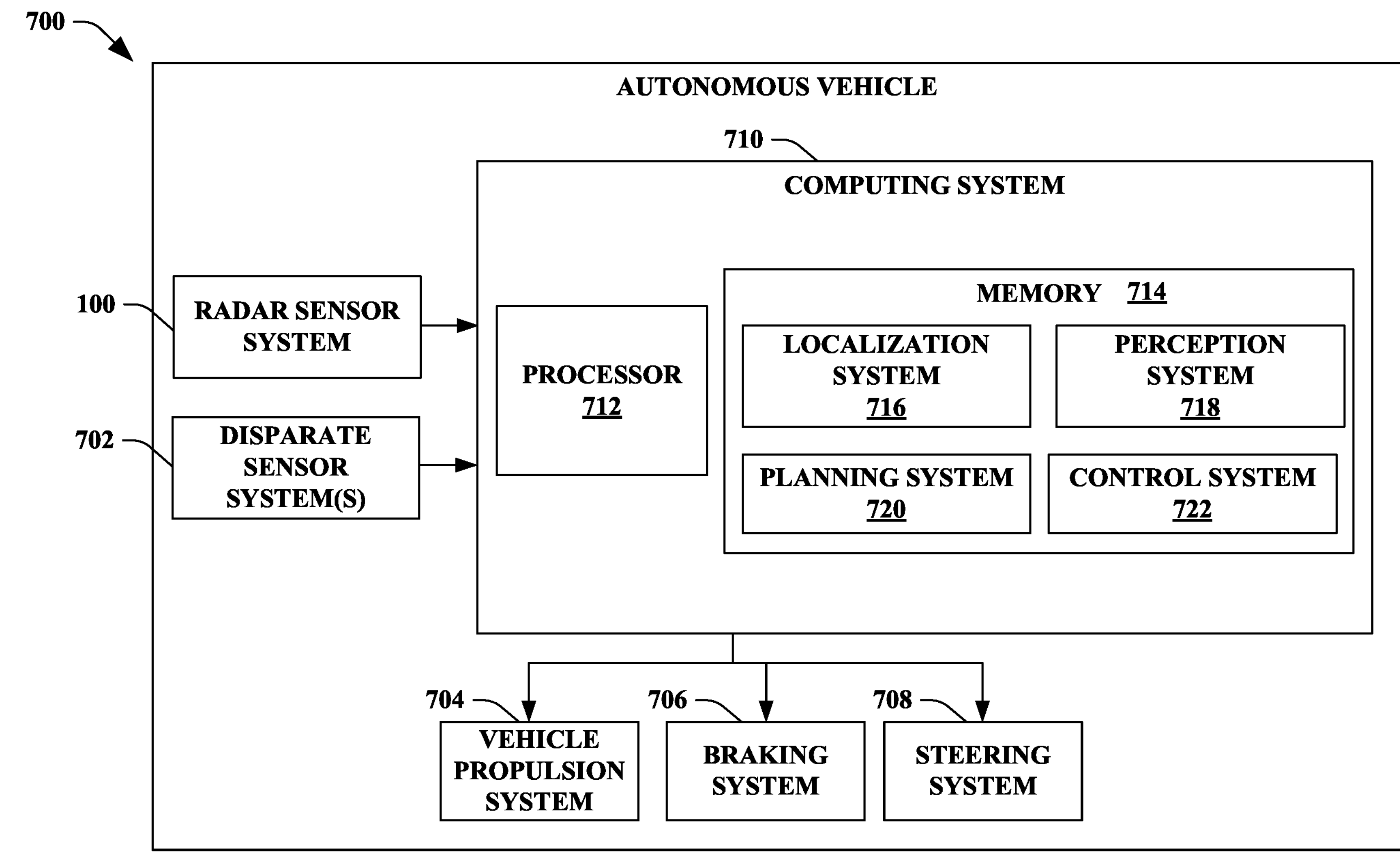
FIG. 7 illustrates a functional block diagram of an exemplary autonomous vehicle that includes the radar sensor system.

Turning to FIG. 7, illustrated is an autonomous vehicle 700. The autonomous vehicle 700 can navigate about roadways without human conduction based upon sensor signals outputted by sensor systems of the autonomous vehicle 700. The autonomous vehicle 700 includes a plurality of sensor systems. More particularly, the autonomous vehicle 700 includes the radar sensor system 100 described herein. The autonomous vehicle 700 can further include one or more disparate sensor systems 702. The disparate sensor systems 702 can include GPS sensor system(s), ultrasonic sensor sensor(s), infrared sensor system(s), camera system(s), lidar sensor system(s), and the like. The sensor systems 100 and 702 can be arranged about the autonomous vehicle 700.

The autonomous vehicle 700 further includes several mechanical systems that are used to effectuate appropriate motion of the autonomous vehicle 700. For instance, the mechanical systems can include, but are not limited to, a vehicle propulsion system 704, a braking system 706, and a steering system 708. The vehicle propulsion system 704 may be an electric engine or a combustion engine. The braking system 706 can include an engine brake, brake pads, actuators, and/or any other suitable componentry that is configured to assist in decelerating the autonomous vehicle 700. The steering system 708 includes suitable componentry that is configured to control the direction of movement of the autonomous vehicle 700.

The autonomous vehicle 700 additionally includes a computing system 710 that is in communication with the sensor systems 100 and 702, the vehicle propulsion system 704, the braking system 706, and the steering system 708. The computing system 710 includes a processor 712 and memory 714; the memory 714 includes computer-executable instructions that are executed by the processor 712. Pursuant to various examples, the processor 712 can be or include a graphics processing unit (GPU), a plurality of GPUs, a central processing unit (CPU), a plurality of CPUs, an application-specific integrated circuit (ASIC), a digital signal processor (DSP), a microcontroller, a programmable logic controller (PLC), a field programmable gate array (FPGA), or the like.

The memory 714 of the computing system 710 can include a localization system 716, a perception system 718, a planning system 720, and a control system 722. The localization system 716 can be configured to determine a local position of the autonomous vehicle 700. The perception system 718 can be configured to perceive objects nearby the autonomous vehicle 700 (e.g., based on outputs from the sensor systems 100 and 702). For instance, the perception system 718 can detect, classify, and predict behaviors of objects nearby the autonomous vehicle 700. The perception system 718 (and/or differing system(s) included in the memory 714) can track the objects nearby the autonomous vehicle 700 and/or make predictions with respect to the environment in which the autonomous vehicle 700 is operating (e.g., predict the behaviors of the objects nearby the autonomous vehicle 700). Further, the planning system 722 can plan motion of the autonomous vehicle 700. Moreover, the control system 722 can be configured to control at least one of the mechanical systems of the autonomous vehicle 700 (e.g., at least one of the vehicle propulsion system 704, the braking system 706, and/or the steering system 708).

An operation of the autonomous vehicle 700 can be controlled by the computing system 710 based at least in part on the output data generated by the radar sensor system 100. While the radar sensor system 100 is described as being included as part of the autonomous vehicle 700 in FIG. 7, it is contemplated that the radar sensor system 100 can be utilized in other types of scenarios (e.g., included in other types of systems, etc.).

Figure 8:
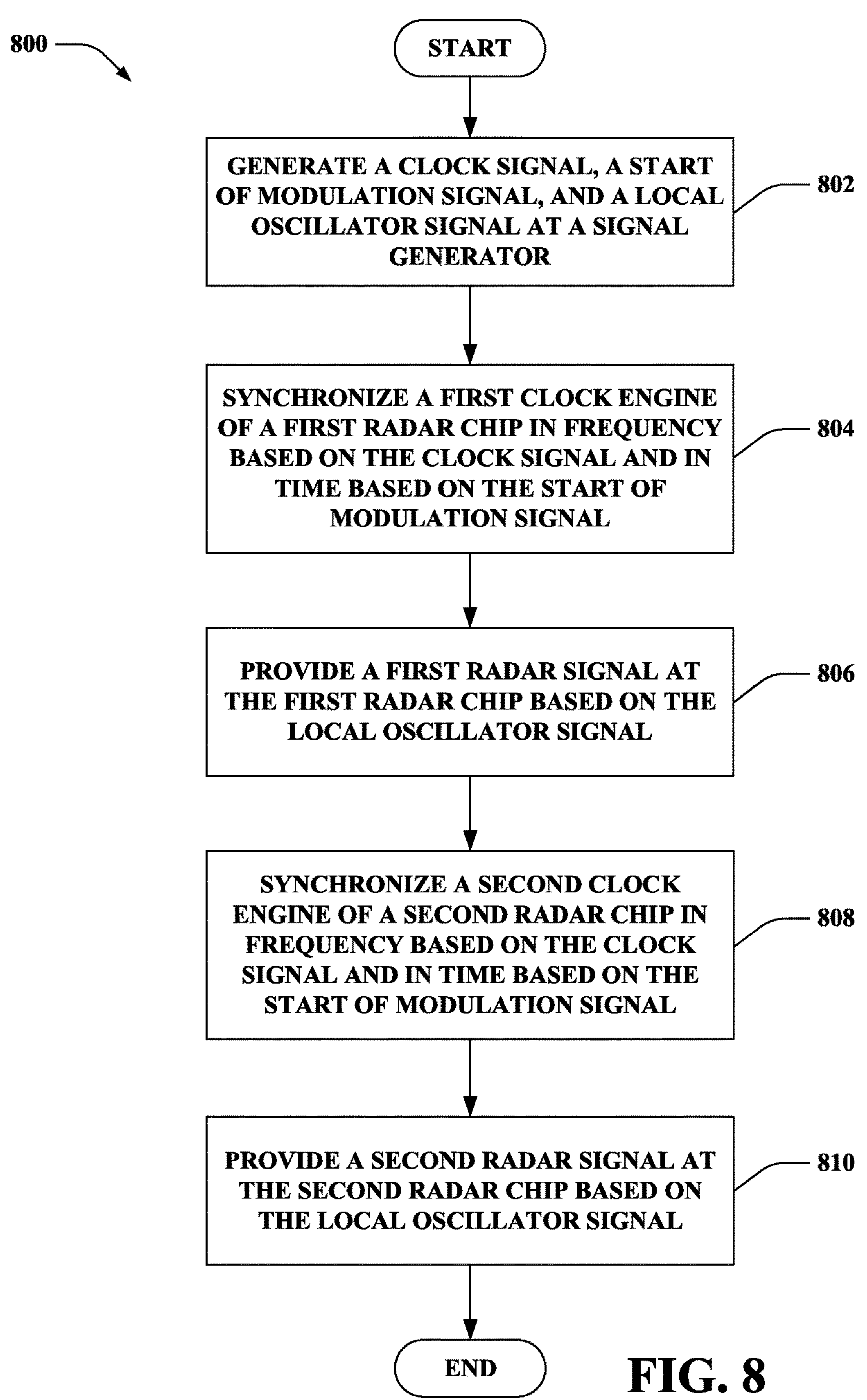
FIG. 8 is a flow diagram that illustrates an exemplary methodology of synchronizing radar chips of a radar sensor system.

FIG. 8 illustrates an exemplary methodology relating to synchronizing multiple radar chips of a radar sensor system. While the methodology is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

FIG. 8 illustrates a methodology 800 of synchronizing radar chips of a radar sensor system. At 802, a clock signal, a start of modulation signal, and a local oscillator signal can be generated at a signal generator of the radar sensor system. At 804, a first clock engine of a first radar chip can be synchronized in frequency based on the clock signal and can be synchronized in time based on the start of modulation signal. At 806, a first radar signal can be provided at the first radar chip based on the local oscillator signal, where the first radar signal is synchronized with the first clock engine. At 808, a second clock engine of a second radar chip can be synchronized in frequency based on the clock signal and can be synchronized in time based on the start of modulation signal. At 810, a second radar signal can be provided at the second radar chip based on the oscillator signal, where the second radar signal is synchronized with the second clock engine.

Figure 9:
FIG. 9 illustrates an exemplary computing device.
Figure 9:
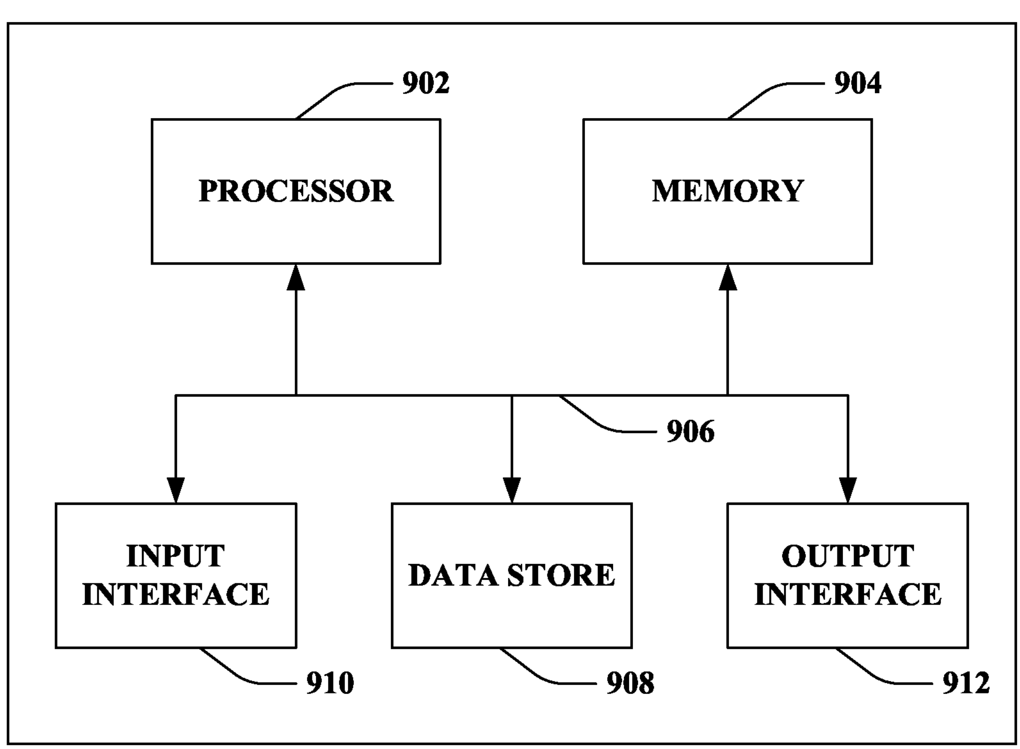

Referring now to FIG. 9, a high-level illustration of an exemplary computing device 900 that can be used in accordance with the systems and methodologies disclosed herein is illustrated. For instance, the computing device 900 may be or include the computing system 710. The computing device 900 includes at least one processor 902 that executes instructions that are stored in a memory 904. The instructions may be, for instance, instructions for implementing functionality described as being carried out by one or more systems discussed above or instructions for implementing one or more of the methods described above. The processor 902 may be a GPU, a plurality of GPUs, a CPU, a plurality of CPUs, a multi-core processor, etc. The processor 902 may access the memory 904 by way of a system bus 906. In addition to storing executable instructions, the memory 904 may also store passenger profiles, information pertaining to passengers, information pertaining to a ride-sharing trip, and so forth.

The computing device 900 additionally includes a data store 908 that is accessible by the processor 902 by way of the system bus 906. The data store 908 may include executable instructions, passenger profiles, information pertaining to passengers, information pertaining to a ride-sharing trip, etc. The computing device 900 also includes an input interface 910 that allows external devices to communicate with the computing device 900. For instance, the input interface 910 may be used to receive instructions from an external computer device, etc. The computing device 900 also includes an output interface 912 that interfaces the computing device 900 with one or more external devices. For example, the computing device 900 may transmit control signals to the vehicle propulsion system 704, the braking system 706, and/or the steering system 708 by way of the output interface 912.

Additionally, while illustrated as a single system, it is to be understood that the computing device 900 may be a distributed system. Thus, for instance, several devices may be in communication by way of a network connection and may collectively perform tasks described as being performed by the computing device 900.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Systems and methods have been described herein in accordance with at least the examples set forth below.

(A1) In one aspect, a radar sensor system is disclosed herein. The radar sensor system includes a signal generator configured to generate a clock signal, a start of modulation signal, and a local oscillator signal. The radar sensor system also includes a first radar chip comprising a first clock engine and at least one of a first transmitter or a first receiver, where the first radar chip is configured to: receive the clock signal, the start of modulation signal, and the local oscillator signal from the signal generator; synchronize the first clock engine in frequency based on the clock signal; synchronize the first clock engine in time based on the start of modulation signal; and provide a first radar signal based on the local oscillator signal, wherein the first radar signal is synchronized with the first clock engine. The radar sensor system further includes a second radar chip comprising a second clock engine and at least one of a second transmitter or a second receiver, where the second radar chip is configured to: receive the clock signal, the start of modulation signal, and the local oscillator signal from the signal generator; synchronize the second clock engine in frequency based on the clock signal; synchronize the second clock engine in time based on the start of modulation signal; and provide a second radar signal based on the local oscillator signal, wherein the second radar signal is synchronized with the second clock engine.

(A2) In some embodiments of the radar sensor system of (A1), the radar sensor system also includes a radar processor in communication with the signal generator, the first radar chip, and the second radar chip.

(A3) In some embodiments of the radar sensor system of (A2), the radar processor is configured to control the signal generator such that the radar processor sets a modulation scheme and triggers a start of measurement.

(A4) In some embodiments of at least one of the radar sensor systems of (A2)-(A3), the radar processor is configured to: receive first radar data from the first radar chip and second radar data from the second radar chip; and process the first radar data and the second radar data to generate output data.

(A5) In some embodiments of at least one of the radar sensor systems of (A2)-(A4), the radar processor and the signal generator are part of a common chip.

(A6) In some embodiments of at least one of the radar sensor systems of (A1)-(A5), the first radar chip comprises the first transmitter and the first receiver, the first transmitter emits the first radar signal into an environment of the radar sensor system, and the first receiver receives a first return signal from the environment responsive to the first radar signal; and the second radar chip comprises the second transmitter and the second receiver, the second transmitter emits the second radar signal into the environment of the radar sensor system, and the second receiver receives a second return signal from the environment responsive to the second radar signal.

(A7) In some embodiments of at least one of the radar sensor systems of (A1)-(A6), the first radar chip comprises a plurality of transmitters, the plurality of transmitters comprises the first transmitter; and the second radar chip comprises a plurality of receivers, the plurality of receivers comprises the second receiver.

(A8) In some embodiments of at least one of the radar sensor systems of (A1)-(A7), the radar sensor system further includes a third radar chip comprising a third clock engine and at least one of a third transmitter or a third receiver, the third radar chip configured to: receive the clock signal, the start of modulation signal, and the local oscillator signal from the signal generator; synchronize the third clock engine in frequency based on the clock signal; synchronize the third clock engine in time based on the start of modulation signal; and provide a third radar signal based on the local oscillator signal, wherein the third radar signal is synchronized with the third clock engine.

(A9) In some embodiments of at least one of the radar sensor systems of (A1)-(A8), the first radar chip comprises the signal generator.

(A10) In some embodiments of at least one of the radar sensor systems of (A1)-(A8), the signal generator is part of a chip that is separate from the first radar chip and the second radar chip.

(A11) In some embodiments of at least one of the radar sensor systems of (A1)-(A10), the first radar chip further comprises a first frequency multiplier configured to multiply the local oscillator signal to provide the first radar signal; and the second radar chip further comprises a second frequency multiplier configured to multiply the local oscillator signal to provide the second radar signal.

(B1) In another aspect, a method of synchronizing radar chips of a radar sensor system is disclosed herein, where the method includes generating a clock signal, a start of modulation signal, and a local oscillator signal at a signal generator of the radar sensor system. The method further includes synchronizing a first clock engine of a first radar chip in frequency based on the clock signal and in time based on the start of modulation signal. Moreover, the method includes providing a first radar signal at the first radar chip based on the local oscillator signal, wherein the first radar signal is synchronized with the first clock engine. The method also includes synchronizing a second clock engine of a second radar chip in frequency based on the clock signal and in time based on the start of modulation signal. Additionally, the method includes providing a second radar signal at the second radar chip based on the local oscillator signal, wherein the second radar signal is synchronized with the second clock engine.

(B2) In some embodiments of the method of (B1), the method further includes controlling a modulation scheme employed by the signal generator.

(B3) In some embodiments of at least one of the methods of (B1)-(B2), the method further includes processing first radar data from the first radar chip and second radar data from the second radar chip to generate output data.

(B4) In some embodiments of at least one of the methods of (B1)-(B3), the method further includes emitting the first radar signal into an environment of the radar sensor system, and emitting the second radar signal into the environment of the radar sensor system.

(B5) In some embodiments of at least one of the methods of (B1)-(B4), providing the first radar signal at the first radar chip based on the local oscillator signal further comprises multiplying the local oscillator signal in frequency at the first radar chip; and providing the second radar signal at the second radar chip based on the local oscillator signal further comprises multiplying the local oscillator signal in frequency at the second radar chip.

(C1) In another aspect, an autonomous vehicle is disclosed herein, where the autonomous vehicle includes a radar sensor system. The radar sensor system includes a signal generator configured to generate a clock signal, a start of modulation signal, and a local oscillator signal. The radar sensor system further includes a first radar chip comprising a first clock engine and at least one of a first transmitter or a first receiver, where the first radar chip is configured to: receive the clock signal, the start of modulation signal, and the local oscillator signal from the signal generator; synchronize the first clock engine in frequency based on the clock signal; synchronize the first clock engine in time based on the start of modulation signal; and provide a first radar signal based on the local oscillator signal, wherein the first radar signal is synchronized with the first clock engine. The radar sensor system also includes a second radar chip comprising a second clock engine and at least one of a second transmitter or a second receiver, where the second radar chip is configured to: receive the clock signal, the start of modulation signal, and the local oscillator signal from the signal generator; synchronize the second clock engine in frequency based on the clock signal; synchronize the second clock engine in time based on the start of modulation signal; and provide a second radar signal based on the local oscillator signal, wherein the second radar signal is synchronized with the second clock engine. Moreover, the radar sensor system includes a radar processor in communication with the signal generator, the first radar chip, and the second radar chip, wherein the radar processor is configured to: receive radar data from at least one of the first radar chip or the second radar chip; and process the radar data to generate output data. The autonomous vehicle further includes a computing system that is in communication with the radar sensor system, wherein the computing system comprises: a processor; and memory that stores computer-executable instructions that, when executed by the processor, cause the processor to perform acts. The acts include receiving the output data from the radar sensor system; and controlling an operation of the autonomous vehicle based on the output data.

(C2) In some embodiments of the autonomous vehicle of (C1), the radar processor is further configured to control the signal generator such that the radar processor sets a modulation scheme and triggers a start of measurement.

(C3) In some embodiments of at least one of the autonomous vehicles of (C1)-(C2), the first radar chip comprises a plurality of transmitters, the plurality of transmitters comprises the first transmitter; and the second radar chip comprises a plurality of receivers, the plurality of receivers comprises the second receiver.

(C4) In some embodiments of at least one of the autonomous vehicles of (C1)-(C3), the signal generator is part of a chip that is separate from the first radar chip and the second radar chip.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A radar sensor system, comprising:

a signal generator configured to generate a clock signal, a start of modulation signal, and a local oscillator signal, wherein the local oscillator signal is a modulated waveform generated at the signal generator and distributed to two or more radar chips at a lower frequency than corresponding radar transmit frequencies;

a first radar chip of the two or more radar chips comprising a first clock engine and at least one of a first transmitter or a first receiver, the first radar chip configured to:

receive the clock signal, the start of modulation signal, and the local oscillator signal from the signal generator;

synchronize the first clock engine in frequency based on the clock signal;

synchronize the first clock engine in time based on the start of modulation signal; and provide a first radar signal based on the local oscillator signal by multiplying the local oscillator signal in frequency at the first radar chip, wherein the first radar signal is synchronized with the first clock engine; and a second radar chip of the two or more radar chips comprising a second clock engine and at least one of a second transmitter or a second receiver, the second radar chip configured to:

receive the clock signal, the start of modulation signal, and the local oscillator signal from the signal generator;

synchronize the second clock engine in frequency based on the clock signal;

synchronize the second clock engine in time based on the start of modulation signal; and provide a second radar signal based on the local oscillator signal by multiplying the local oscillator signal in frequency at the second radar chip, wherein the second radar signal is synchronized with the second clock engine, and wherein synchronizing the first clock engine in time based on the start of modulation signal and synchronizing the second clock engine in time based on the start of modulation signal causes a start of the first radar signal to coincide with a start of the second radar signal, wherein the start of modulation signal generated by the signal generator is aligned with a start of modulation of the local oscillator signal generated by the signal generator to provide phase and phase-noise coherence across the first and second radar chips.

2. The radar sensor system of claim 1, further comprising a radar processor in communication with the signal generator, the first radar chip, and the second radar chip.

3. The radar sensor system of claim 2, wherein the radar processor is configured to control the signal generator such that the radar processor sets a modulation scheme and triggers a start of measurement.

4. The radar sensor system of claim 2, wherein the radar processor is configured to:

receive first radar data from the first radar chip;

receive second radar data from the second radar chip; and process the first radar data and the second radar data to generate output data.

5. The radar sensor system of claim 2, wherein the radar processor and the signal generator are part of a common chip.

6. The radar sensor system of claim 1, wherein:

the first radar chip comprises the first transmitter and the first receiver, wherein the first transmitter is configured to emit the first radar signal into an environment of the radar sensor system, and wherein the first receiver is configured to receive a first return signal from the environment responsive to the first radar signal; and the second radar chip comprises the second transmitter and the second receiver, wherein the second transmitter is configured to emit the second radar signal into the environment of the radar sensor system, and wherein the second receiver is configured to receive a second return signal from the environment responsive to the second radar signal.

7. The radar sensor system of claim 1, wherein:

the first radar chip comprises a plurality of transmitters, the plurality of transmitters comprising the first transmitter; and the second radar chip comprises a plurality of receivers, the plurality of receivers comprising the second receiver.

8. The radar sensor system of claim 1, further comprising a third radar chip comprising a third clock engine and at least one of a third transmitter or a third receiver, wherein the third radar chip is configured to:

receive the clock signal, the start of modulation signal, and the local oscillator signal from the signal generator;

synchronize the third clock engine in frequency based on the clock signal;

synchronize the third clock engine in time based on the start of modulation signal; and provide a third radar signal using the local oscillator signal, wherein the third radar signal is synchronized with the third clock engine.

9. The radar sensor system of claim 1, wherein the first radar chip comprises the signal generator.

10. The radar sensor system of claim 1, wherein the signal generator is part of a chip that is separate from the first radar chip and the second radar chip.

11. The radar sensor system of claim 1, wherein:

the first radar chip further comprises a first frequency multiplier configured to multiply the local oscillator signal to provide the first radar signal; and the second radar chip further comprises a second frequency multiplier configured to multiply the local oscillator signal to provide the second radar signal.

12. A method of synchronizing radar chips of a radar sensor system, the method comprising:

generating a clock signal, a start of modulation signal, and a local oscillator signal at a signal generator of the radar sensor system, wherein the local oscillator signal is a modulated waveform generated at the signal generator and distributed to two or more radar chips at a lower frequency than corresponding radar transmit frequencies;

synchronizing a first clock engine of a first radar chip in frequency based on the clock signal and in time based on the start of modulation signal;

providing a first radar signal at the first radar chip based on the local oscillator signal by multiplying the local oscillator signal in frequency at the first radar chip, wherein the first radar signal is synchronized with the first clock engine;

synchronizing a second clock engine of a second radar chip in frequency based on the clock signal and in time based on the start of modulation signal; and providing a second radar signal at the second radar chip based on the local oscillator signal by multiplying the local oscillator signal in frequency at the second radar chip, wherein the second radar signal is synchronized with the second clock engine, and wherein synchronizing the first clock engine in time based on the start of modulation signal and synchronizing the second clock engine in time based on the start of modulation signal causes a start of the first radar signal to coincide with a start of the second radar signal, wherein the start of modulation signal generated by the signal generator is aligned with a start of modulation of the local oscillator signal generated by the signal generator to provide phase and phase-noise coherence across the first and second radar chips.

13. The method of claim 12, further comprising controlling a modulation scheme employed by the signal generator.

14. The method of claim 12, further comprising processing first radar data from the first radar chip and second radar data from the second radar chip to generate output data.

15. The method of claim 12, further comprising:
emitting the first radar signal into an environment of the radar sensor system; and
emitting the second radar signal into the environment of the radar sensor system.

16. The method of claim 12, wherein:
providing the first radar signal at the first radar chip using the local oscillator signal comprises multiplying the local oscillator signal in frequency at the first radar chip; and
providing the second radar signal at the second radar chip using the local oscillator signal comprises multiplying the local oscillator signal in frequency at the second radar chip.

17. An autonomous vehicle, comprising:
a radar sensor system, comprising:
a signal generator configured to generate a clock signal, a start of modulation signal, and a local oscillator signal, wherein the local oscillator signal is a modulated waveform generated at the signal generator and distributed to two or more radar chips at a lower frequency than corresponding radar transmit frequencies;
a first radar chip of the two or more radar chips comprising a first clock engine and at least one of a first transmitter or a first receiver, the first radar chip configured to:
receive the clock signal, the start of modulation signal, and the local oscillator signal from the signal generator;
synchronize the first clock engine in frequency based on the clock signal;
synchronize the first clock engine in time based on the start of modulation signal; and
provide a first radar signal based on the local oscillator signal by multiplying the local oscillator signal in frequency at the first radar chip, wherein the first radar signal is synchronized with the first clock engine;
a second radar chip of the two or more radar chips comprising a second clock engine and at least one of a second transmitter or a second receiver, the second radar chip configured to:
receive the clock signal, the start of modulation signal, and the local oscillator signal from the signal generator;
synchronize the second clock engine in frequency based on the clock signal;
synchronize the second clock engine in time based on the start of modulation signal; and
provide a second radar signal based on the local oscillator signal by multiplying the local oscillator signal in frequency at the second radar chip, wherein the second radar signal is synchronized with the second clock engine, wherein synchronizing the first clock engine in time based on the start of modulation signal and synchronizing the second clock engine in time based on the start of modulation signal causes a start of the first radar signal to coincide with a start of the second radar signal, and wherein the start of modulation signal generated by the signal generator is aligned with a start of modulation of the local oscillator signal generated by the signal generator to provide phase and phase-noise coherence across the first and second radar chips; and
a radar processor in communication with the signal generator, the first radar chip, and the second radar chip, wherein the radar processor is configured to:
receive radar data from at least one of the first radar chip or the second radar chip; and
process the radar data to generate output data; and
a computing system in communication with the radar sensor system, wherein the computing system comprises:
a processor; and
memory that stores computer-executable instructions that, when executed by the processor, cause the processor to perform acts comprising:
receiving the output data from the radar sensor system; and
controlling an operation of the autonomous vehicle based on the output data.

18. The autonomous vehicle of claim 17, wherein the radar processor is further configured to control the signal generator such that the radar processor sets a modulation scheme and triggers a start of measurement.

19. The autonomous vehicle of claim 17, wherein:
the first radar chip comprises a plurality of transmitters, the plurality of transmitters comprising the first transmitter; and
the second radar chip comprises a plurality of receivers, the plurality of receivers comprising the second receiver.

20. The autonomous vehicle of claim 17, wherein the signal generator is part of a chip that is separate from the first radar chip and the second radar chip.

* * * * *